(12) United States Patent
Hou et al.

(10) Patent No.: US 9,288,235 B1
(45) Date of Patent: Mar. 15, 2016

(54) CONTEXTUALLY AWARE DEVICE MANAGEMENT

(71) Applicant: Microsoft Corporation, Redmond, WA (US)

(72) Inventors: Justin A. Hou, Seattle, WA (US); Javier Novales, Issaquah, WA (US); Peter J. Kaufman, Sammamish, WA (US); Erhan J. Kartaltepe, Newcastle, WA (US); John C. Spaith, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/489,339

(22) Filed: Sep. 17, 2014

(51) Int. Cl.
*G06F 21/00* (2013.01)
*H04L 29/06* (2006.01)
*G06F 21/44* (2013.01)

(52) U.S. Cl.
CPC ............... *H04L 63/20* (2013.01); *G06F 21/44* (2013.01); *G06F 2221/2129* (2013.01)

(58) Field of Classification Search
CPC ..... G06F 21/305; G06F 21/629; H04L 63/08; H04L 63/102; H04L 63/04; H04L 63/0876
USPC .......................................................... 726/1
See application file for complete search history.

(56) References Cited

U.S. PATENT DOCUMENTS

| 6,748,195 | B1 | 6/2004 | Phillips |
| 6,750,883 | B1 | 6/2004 | Parupudi et al. |
| 7,072,956 | B2 | 7/2006 | Parupudi et al. |
| 7,096,029 | B1 | 8/2006 | Parupudi et al. |
| 7,743,074 | B1 | 6/2010 | Parupudi et al. |
| 8,578,443 | B2 | 11/2013 | Narain et al. |

(Continued)

FOREIGN PATENT DOCUMENTS

WO 2013165355 A1 11/2013

OTHER PUBLICATIONS

Taconet, Chantal, Erik Putrycz, and Guy Bernard. "Context aware deployment for mobile users." Computer Software and Applications Conference, 2003. COMPSAC 2003. Proceedings. 27th Annual International. IEEE, 2003.*

(Continued)

*Primary Examiner* — Syed Zaidi
(74) *Attorney, Agent, or Firm* — Timothy Churna; Judy Yee; Micky Minhas

(57) ABSTRACT

Contextually aware device management techniques are described. Identifying data is provided via a communication connection by a client device to a service provider via a network that is usable by the service provider to identify the client device or functionality of the client device. One or more contexts are received at the client device from the service provider via the network that correspond to the identifying data. Each of the one or more contexts includes management objects along with one or more triggers configured to cause the context to transition to a corresponding one of a plurality of context states and thereby cause performance of one or more actions corresponding to the context state. The one or more contexts are implemented locally by the client device effective to identify and perform the one or more actions corresponding to the context state by the client device based on identification of the one or more triggers without use of network communication by the client device.

20 Claims, 7 Drawing Sheets

(56) References Cited

U.S. PATENT DOCUMENTS

| | | | |
|---|---|---|---|
| 8,676,985 | B2 | 3/2014 | Assuncao et al. |
| 8,813,167 | B2 | 8/2014 | Mantere et al. |
| 9,094,822 | B2 * | 7/2015 | Kurupacheril ........ H04W 12/06 |
| 2002/0013939 | A1 * | 1/2002 | Daynes .................... G06F 8/61 717/170 |
| 2006/0073788 | A1 | 4/2006 | Halkka et al. |
| 2007/0162474 | A1 | 7/2007 | Parupudi et al. |
| 2007/0261048 | A1 * | 11/2007 | Bernabeu-Auban  G06F 9/44505 717/170 |
| 2009/0132682 | A1 * | 5/2009 | Counterman ........... H04L 63/08 709/220 |
| 2010/0315200 | A1 * | 12/2010 | Warrier ................ G06F 21/305 340/5.51 |
| 2010/0317371 | A1 | 12/2010 | Westerinen et al. |
| 2012/0051262 | A1 | 3/2012 | Clark et al. |
| 2012/0131155 | A1 | 5/2012 | Madey et al. |
| 2012/0324434 | A1 | 12/2012 | Tewari et al. |
| 2013/0247166 | A1 | 9/2013 | Freedman et al. |
| 2013/0254831 | A1 | 9/2013 | Roach et al. |
| 2013/0297547 | A1 | 11/2013 | Ding et al. |
| 2014/0187200 | A1 | 7/2014 | Reitter et al. |

OTHER PUBLICATIONS

Desertot, Mikael, et al. "A context aware framework for services management in the transportation domain." New Technologies of Distributed Systems (NOTERE), 2010 10th Annual International Conference on. IEEE, 2010.*

Conti, Mauro, Vu Thien Nga Nguyen, and Bruno Crispo. "CRePE: Context-related policy enforcement for Android." Information Security. Springer Berlin Heidelberg, 2011. 331-345.*

Cervantes, Humberto, and Richard S. Hall. "Automating service dependency management in a service-oriented component model." ICSE CBSE Workshop. 2003.*

Connelly, et al., "On Negotiating Automatic Device Configuration in Smart Environments", In Proceedings of the Second IEEE Annual Conference on Pervasive Computing and Communications Workshops, Mar. 14, 2004, 6 pages.

European Patent Office, "Notification of Transmittal of the International Search Report and the Written Opinion of the International Searching Authority," issued in PCT Application No. PCT/US2015/049881, mailed Date: Nov. 18, 2015, 14 Pages.

* cited by examiner

CONTEXTUALLY AWARE DEVICE MANAGEMENT

BACKGROUND

Privacy and security are a priority for consumers and companies that use devices that contain personal or highly confidential information and data. In order to secure these devices, companies often use a server-based management service to configure devices with a set of policies, settings, resources, and applications to ensure devices are secured, including the information and data on the device.

In today's world, however, devices are no longer used for a single purpose. For example, a laptop may be used for both personal and work, the same phone can be used by a cashier for check-out and inventory uses in the backroom, a tablet may be mounted in a store to show promotional advertisement but also enable a store employees to check inventory or a store manager to check employee shift schedules, and so forth.

Conventional solutions to manage these devices involve manual user interaction to change the set of policies, settings, resources, and applications. However, this approach does not take into account the dynamic nature of devices that move around through a variety of environments as described above. Other conventional techniques involve use of a server-based service with environmental context and rely on the server-based management service to make changes to the configuration. While this may support provide dynamic changes to the set of policies, settings, resources, and applications, it relies on a network connection that may not be accessible in some situations, especially by mobile devices. Further, transmission of certain contextual signals to a server-based management service may not be allowed due to privacy concerns.

SUMMARY

Contextually aware device management techniques are described. Identifying data is provided via a communication connection by a client device to a service provider via a network that is usable by the service provider to identify the client device or functionality of the client device. One or more contexts are received at the client device from the service provider via the network that correspond to the identifying data. Each of the one or more contexts includes management objects along with one or more triggers configured to cause the context to transition to a corresponding one of a plurality of context states and thereby cause performance of one or more actions corresponding to the context state. The one or more contexts are implemented locally by the client device effective to identify and perform the one or more actions corresponding to the context state by the client device based on identification of the one or more triggers without use of network communication by the client device.

In one or more implementations, a system includes one or more modules implemented at least partially in hardware. The one or more modules are configured to perform operations that include receiving identifying data via a communication connection from a client device. Responsive to this receipt, one or more of a plurality of contexts are identified based on the identifying data, each of the one or more contexts having management objects along with one or more triggers configured to cause the context to transition to a corresponding one of a plurality of context states and thereby cause performance of one or more actions corresponding to the context state. A communication is formed to communicate the identified one or more context via the network to the client device effective to cause the client device to implement the one or more contexts locally by the client device effective to identify and perform the one or more actions corresponding to the context state based on identification of the one or more triggers without communicating with the service provider.

In one or more implementations, a client device includes a processing system and memory maintaining instructions that are executable by the processing system to cause operations to be performed. The operations include providing identifying data via a communication connection to a service provider via a network that is usable by the service provider to identify the client device or functionality of the client device. The operations also include receiving one or more contexts from the service provider via the network that correspond to the identifying data, each of the one or more contexts having management objects along with one or more triggers configured to cause the context to transition to a corresponding one of a plurality of context states and thereby cause performance of one or more actions corresponding to the context state. The operations further include implementing the one or more contexts locally effective to identify and perform the one or more actions corresponding to the context state by the client device based on identification of the one or more triggers without use of network communication.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 7 illustrates an example system including various components of an example device that can be implemented as

DETAILED DESCRIPTION

Overview

Contextually aware device management techniques are described. In one or more implementations, a system may be used to configure a set of configurations, referred to as a "context," for a device to dynamically set and/or change a set of policies, settings, resources, and applications that are applied on the device based on any number or combination of contextual signals.

Additionally, contextual signals can also invoke on-device management actions to occur, which may be performed locally on the device without involvement of a network connection. For example, contextual signals are collected on the device and processed to determine actions without involving transmission of the contextual signal to the server-based management service to determine which actions are to be performed by the computing device. In this way, the device itself may employ the context and react accordingly without further input from the service. Further discussion of these and other examples may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
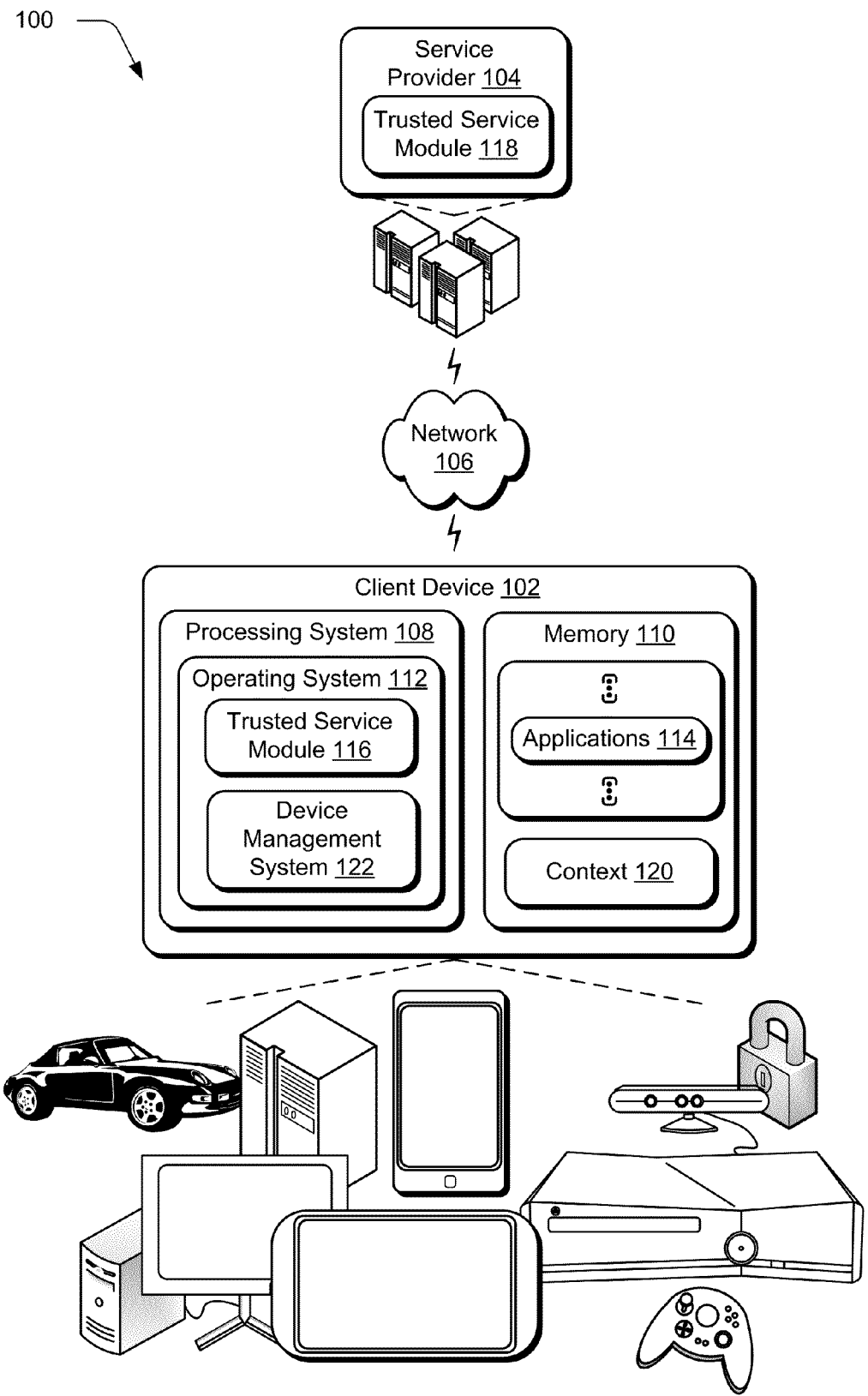
FIG. 1 is an illustration of an environment in an example implementation that is operable to perform contextually aware device management techniques.

FIG. 1 is an illustration of an environment 100 in an example implementation that is operable to employ contextually aware device management techniques described herein. The illustrated environment 100 includes a client device 102 that is communicatively coupled to a service provider 104 via a network 106. Computing devices that implement the client device 102 as well as computing devices that may implement the service provider 104 may be configured in a variety of ways.

For example, a computing device may be configured as a computer that is capable of communicating over the network 106, such as a desktop computer, a mobile station, an entertainment appliance, a set-top box communicatively coupled to a display device, a wireless phone, a game console, and so forth. Computing devices may also include devices includable in the "Internet-of-things", such as light bulbs, locks, cars, kitchen appliances, and so on. Thus, the computing device may range from full resource devices with substantial memory and processor resources (e.g., personal computers, game consoles) to a low-resource device with limited memory and/or processing resources (e.g., thermostats, locks, and so forth). Additionally, a computing device may be representative of a plurality of different devices, such as multiple servers utilized by a business to perform operations such as by the service provider 104, a remote control and set-top box combination, an image capture device and a game console configured to capture gestures, and so on.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The computing device 102 is illustrated as including a variety of hardware components, examples of which include a processing system 108, an example of a computer-readable storage medium illustrated as memory 110, display device as illustrated, may include network connection devices, and so on. The processing system 108 is representative of functionality to perform operations through execution of instructions stored in the memory 110. Although illustrated separately, functionality of these components may be further divided, combined (e.g., on an application specific integrated circuit), and so forth.

The client device 102 is further illustrated as including an operating system 112. The operating system 112 is configured to abstract underlying functionality of the client device 102 to applications 114 that are executable on the client device 102. For example, the operating system 112 may abstract processing system 108, memory 110, network, and/or display device functionality of the client device 102 such that the applications 114 may be written without knowing "how" this underlying functionality is implemented. The application 114, for instance, may provide data to the operating system 112 to be rendered without understanding how this rendering will be performed. The operating system 112 may also represent a variety of other functionality, such as to manage a file system and user interface that is navigable by a user of the client device 102.

The environment 100 also includes a trusted service, functionality of which is represented by a trusted service module 116 implemented locally at the client device 102 and a trusted service module 118 implemented remotely via a network 106 by the service provider 104. The trusted service modules 116, 118 support a trusted service that is configured to create a context 120, which may be defined as an abstract or well-defined grouping of management policies, settings, resources, and/or actions for implementation by a client device 102 and may also define how these contexts 120 are to be applied, accessible, usable, or enforced through use of a device management system 122.

The client device 102, for instance, may be mutually authenticated with a remote trusted service through interaction with the trusted service module 118 of the service provider 104 via the network 106. Functionality of the trusted service may also reside locally on the client device 102 as part of the operating system 112 as illustrated by the trusted service module 116, which trusts its own components that make up the operating system 108.

The client device 102, through authentication with either of the trusted services, may grant the trusted service functionality represented by the trusted service module 116, 118 the ability to communicate, initiate actions, and modify data of the client device 102 over a secured channel. This allows the trusted service to define properties of a context 120, such as which management policies, settings, resources, or actions are associated with a context 120. This may also include provisioning how the context 120 is to be applied, accessible, usable, and/or enforced by the device management system 122 based on a single or combination of triggers associated with the context 120. In this way, the device management system 122 may proactively detect or be reactively notified based on inference through local or remote indicators without involving any direction from the trusted service. Further, the trusted service may delegate to another trusted process, application 114, or endpoint for triggers to be overridden such that a context 120 may be manually activated, deactivated, returned to trigger-based activation and deactivation behavior.

Thus, a trusted service may be utilized to create a context 120 that may be activated/deactivated based on one or more triggers by provisioning and associating management policies, settings, resources, or actions with the context 120. In one or more implementations, the trusted service may delegate permission to another service (e.g., an application 114) which delegated permissions that may include overriding triggering states or associating/de-associating management policies, settings, resources, or actions with a context 120. The trusted service may create any number of contexts 120 on a device that may interact simultaneously. Further, the trusted service may link, group, or order any number of contexts 120 to create tiered applicability of the contexts 120. This enables the trusted service to create a baseline context or the ability to interlink or create dependencies defining when a context trigger is to be addressed. Further, the context 120 may have a pre-defined or dynamically defined active lifespan where the context 120 is automatically de-activated after certain conditions have been met, e.g., which may include temporal and non-temporal conditions. Further discussion of these features may be found in the following description and is shown in corresponding figures.

Figure 2:
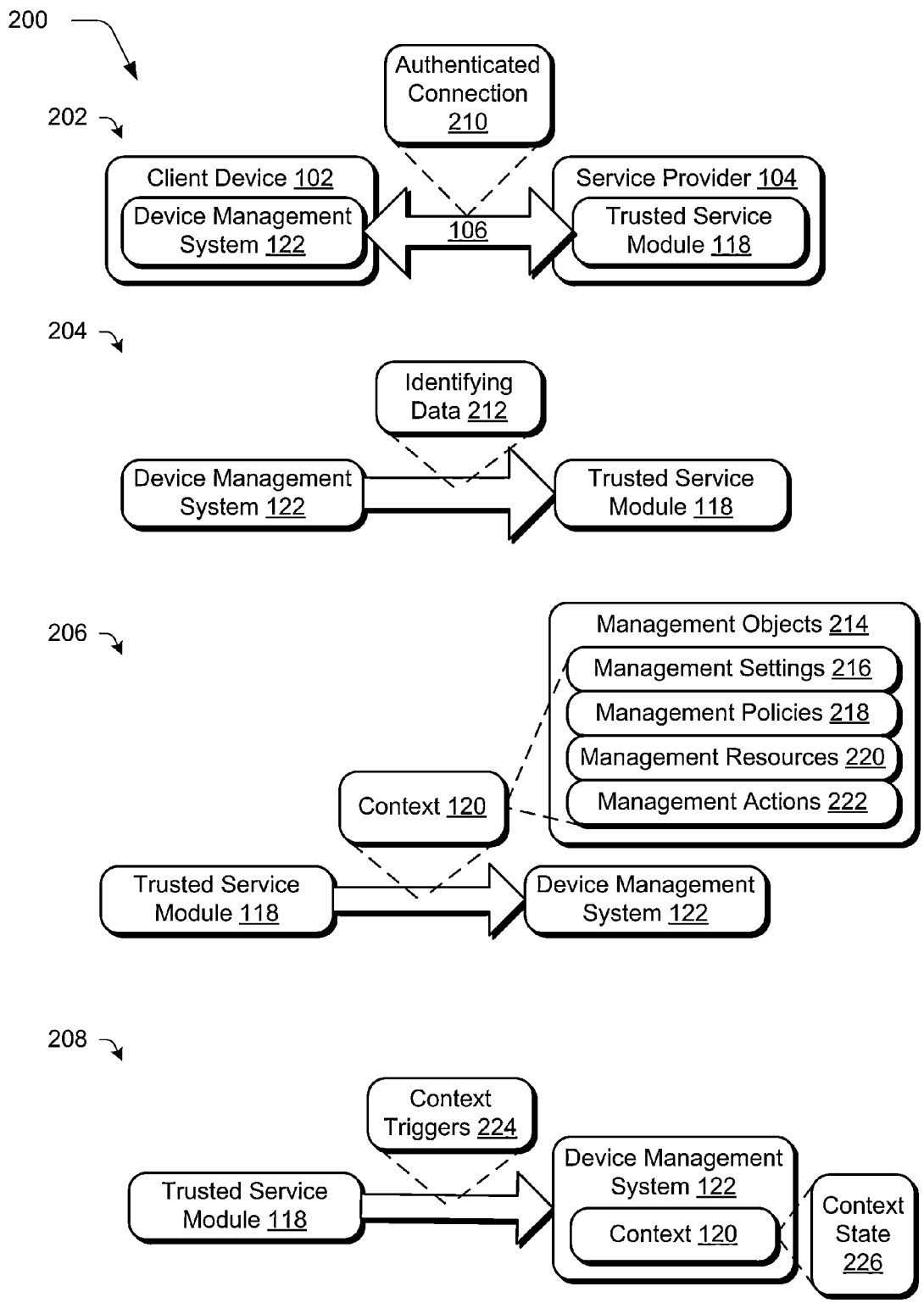
FIG. 2 depicts a system in an example implementation in which a trusted service implemented by a trusted service module of a service provider of FIG. 1 instantiates a context for implementation locally at a client device.

FIG. 2 depicts a system 200 in an example implementation in which a trusted service implemented by a trusted service module 118 of a service provider 104 of FIG. 1 instantiates a context 120 for implementation locally at the client device 102. The system 200 is illustrated through use of first, second, third, and fourth 202, 204, 206, 208 stages. At the first stage 202, an authenticated connection 210 is created between the device management system 122 of the client device 102. This authenticated connection 210 may be initiated in a variety of ways. For example, the device management system 122 may initiate the connection, e.g., when first obtaining a network connection, through a previously set schedule negotiated between the client device 102 and the trusted service module 118 of the service provider 104, and so on. In another example, the trusted service module 118 may initiate the authenticated connection 210 with the client device 102, e.g., through an on-demand connection involving a semi-persistent connection between the client device 102 and the service provider 104 "in the cloud." Further, the authenticated connection 210 may take a variety of forms, such as an Internet connection, utilize cellular-specific forms of communication (e.g., SMS, MMS), and so forth.

At the second stage 204, identifying data 212 is provided by the device management system 122 to the trusted service module 118. The identifying data 212 may be configured in a variety of ways. For example, the identifying data 212 may identify the client device 102 itself (e.g., using a model number or serial number, a user, user account, or business associated with client device 102), may identifying functionality of the client device 102, such as hardware and/or software resources available locally on the client device 102, and so forth. In this way, the device management system 122 may be used to register the client device 102 with the trusted service of the trusted service module 118.

At the third stage 206, the trusted service module 118, through the remote access that is mutually authenticated in the first stage 202 and registration of the second stage 204, is permitted by the device management system 122 to manage operation of the client device 102. To do so, the trusted service module 118 communicates a context 120 to the device management system 122.

The context 120 includes management objects 214 that are usable to manage operation of the client device 102 by the device management system 122, such as to change an overall experience output by the client device 102, e.g., to support a locked down kiosk mode as opposed to an open user mode that support installation of software. Example of management objects 214 include as management settings 216, management policies 218 (e.g., which may change how a user interface looks, which may be dynamic), management resources 220 (e.g., applications Wi-Fi endpoints, VPN), and management actions 222. The context 120, for instance, may define a logical grouping between these management objects 214, such as to specify a tiered applicability of these objects and associated dependencies. Further discussion of use of the management objects 214 of the context 120 in the management of operation of the client device 102 by the device management system 122 may be found in relation to FIG. 4.

At the fourth stage 208, the trusted service module 118 associates context triggers 224 with the context 120 of the device management system 112. The context triggers 224, of instance, are processed using the management objects 214 to determine a context state 226 of the context 102 that are usable to determine actions of the client device 102 that are caused to be performed by the device management system 122. The context triggers 224, for instance, may correspond to signal notifications or active queries of signal data performed by the device management system 122 that, when processed using the management objects 214, determines which of a plurality of context states 226 the context 120 is to be placed. Further discussion of context triggers 224 and context states may be found in the following and is shown in a corresponding figure.

Figure 3:
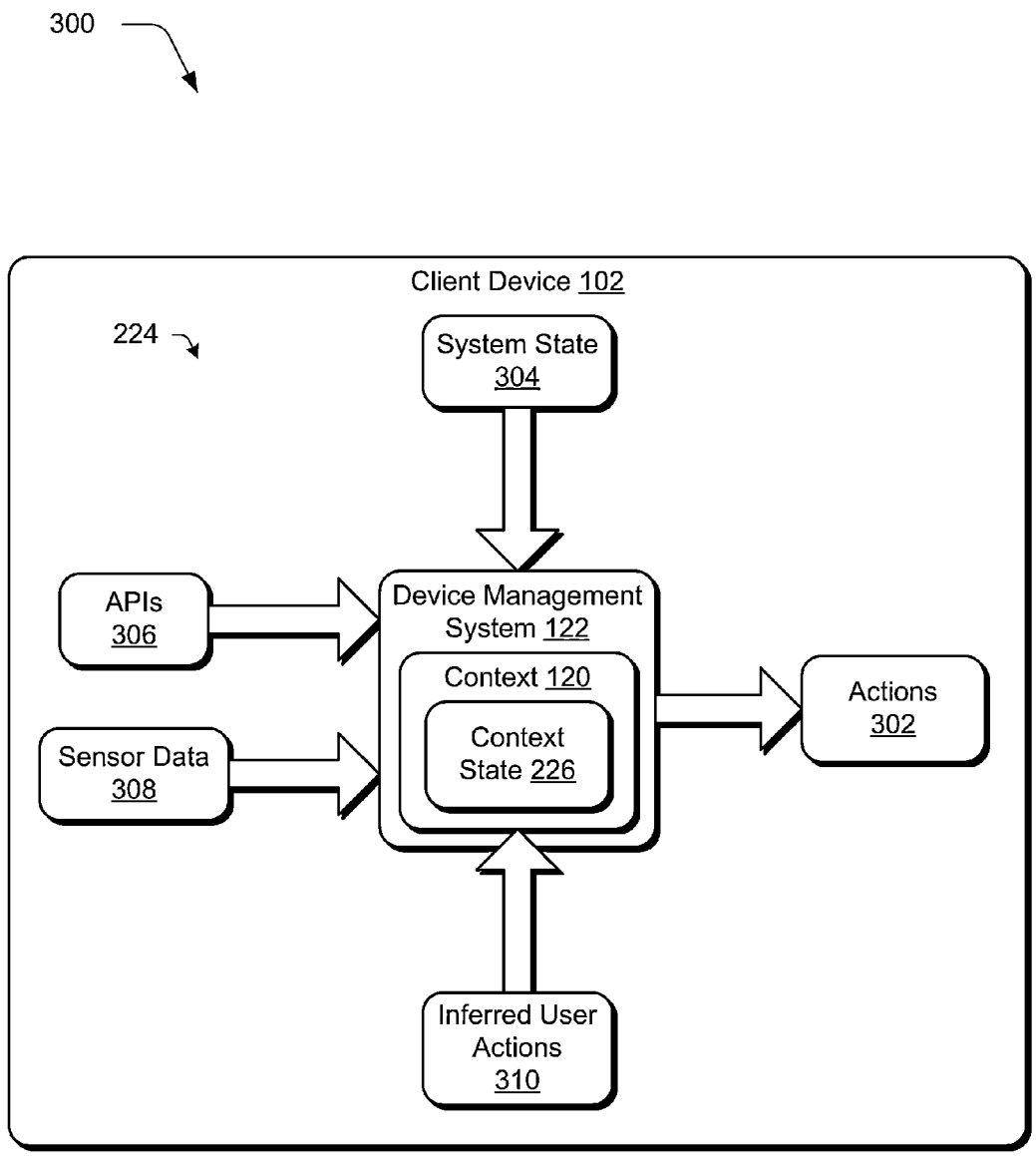
FIG. 3 depicts a system in an example implementation showing a device management system of FIG. 2 in greater detail as receiving a variety of different context triggers that are usable to determine a context state for a context.

FIG. 3 depicts a system 300 in an example implementation showing the device management system 122 in greater detail as receiving a variety of different context triggers 224 that are usable to determine a context state 226 for a context. In this example, the device management system 122 manages operation of a client device 102 by causing the performance of actions 302 based on a context state 226 of a context 120.

The device management system 122, for instance, may determine the context state 226 based on context triggers 224. The context triggers 224 may be configured as contextual signals that are received through active queries performed by the device management system and/or notifications received by the device management system 122. Thus, the context state 226 of the context 120 may be based on signal notifications, active querying of signal data, may be overridden, and so forth. A first such example of a context trigger 224 is a system state 304, which may include whether the client device 102 is in a full or partial power mode, configured to support hibernation, and so on. The system state 304 may also include a state of functionality included as part of the client device 102, such as a state of a network connection as well as a type of that network connection. The network connection, for instance, may include whether the connection is accomplished via a wired or wireless network connection, IP address, use of VPN networks, and so forth.

In another example, APIs 306 may be used to expose data as context triggers 224 to the device management system 122. The APIs 306, for instance, may be exposed by applications 114, third-party plug-in modules, the operating system 112 itself, and so on. Data exposed by the APIs 206, e.g., as part of an API call, may therefore describe a variety of different contexts, such as an execution state of the applications 114, data processed by the applications 114, time or other schedules, and so forth.

In a further example, sensor data 308 may be used as context triggers 224 by the device management system 122. The client device 102, for instance, may include a gyroscope, accelerometer, touch sensor, camera, natural user interface (NUI) input device, microphone, and so forth. Accordingly, sensor data 308 obtained from these sensors may be used as context triggers 224 to determine a context state 226 of the context 120 by the device management system 122.

In yet another example, inferred user actions 310 may be used as context triggers 224. The device management system 122, for instance, may infer actions taken by a user in interacting with the client device 102 and react accordingly. These actions may be inferred in a variety of ways, such as by leveraging sensor data 308 to detect user interaction with the client device 102 as well as an environment in which this user interaction occurs, e.g., location, time of day, and so forth. A variety of other examples are also contemplated.

When a set of conditions are met by the context triggers 224 as specified by the context 120, the context state 226 may change accordingly. The device management system 122, for instance, may process the context state 226 changes and provide actions 302 based on the state changes. This may include exposing the context state 226 to system components which can interpret the state and take action based on these states. Thus, context states 226 may be utilized to cause a variety of actions 302 to be performed by the client device 102, such as a change in management settings, change in management policies, change in managed resources, change in management-related actions, and so forth.

Further, as the device management system 122 and the context 120 is implemented locally at the client device 102, this functionality may be implemented without use of a network connection and without communicating with the trusted service of the trusted service module 118 of the service provider 104 via the network 106. In this way, the device management system 122 may incorporate rule and logic processing for managing and interpreting signal data collected locally on the client device 102. Thus, management of the device and context state may be updated and processed in an offline mode as opposed to conventional techniques that required network connections and communication with network services to determine which actions are to be performed.

Figure 4:
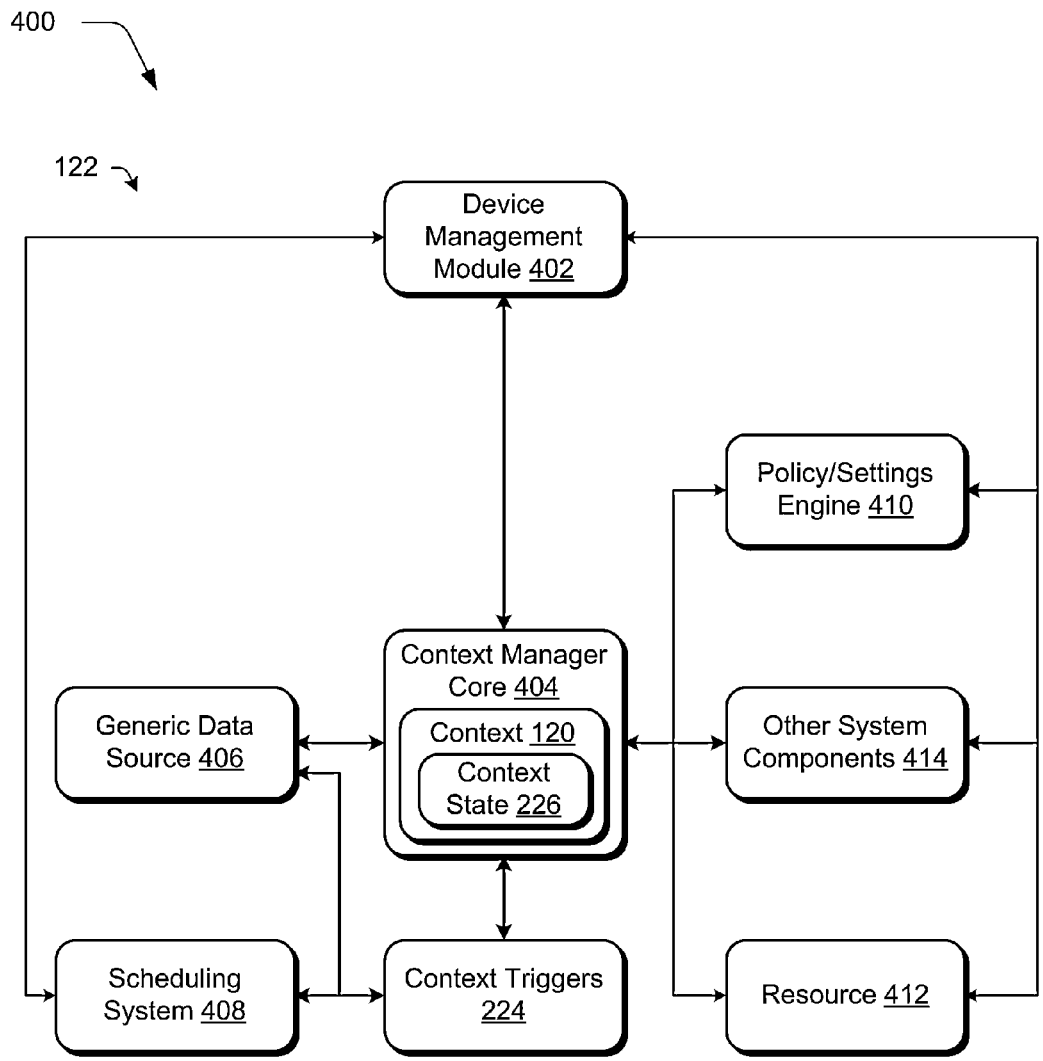
FIG. 4 depicts a system in an example implementation showing examples of components of the device management system of FIG. 3 in greater detail.

FIG. 4 depicts a system 400 in an example implementation showing examples of components of the device management system 122 of FIG. 3 in greater detail. The device management system 112 is illustrated as including a variety of components that include a context manager core 404, generic data source 406, scheduling system 408, policy/settings engine 410, resources, 412, other system components 414 as well as a context 120 and context triggers 224.

As previously described in relation to FIG. 2, the trusted service may use an authenticated connection to create the context 120 which may include assigning or associating a group of management settings, management policies, management resources, or management actions to the context 120. Next, the trusted service configures how the context state changes in response to one or more context triggers 224 and applicable rules as specified by the management objects. Once provisioned on the client device 102 for use as part of the device management system 122, the trusted service may not be further utilized to instruct the device unless changes to the context 120 are to be made. Thus, the device management system 122 may manage the client device 102 in an offline mode without a network communication, including without communication with the trusted service module 118 of the service provider 104.

The device management module 402 is representative of functionality of the device management system 122 to communicate using a network stack of the client device 102 with the trusted service module 118 of the service provider 104 via the network 106. The device management module 402 also has the capability to interact with a context manager core 404 engine to implement the context 120, configure context triggers 224 for the device management system 122 to monitor or listen for changes to for various data sources and signals, and associated management policies, management settings, management resources, management actions, and other system components to the context 120.

The device management system 122 may leverage the context 120 or a set of contexts along with a comprehensive definition of a set of conditions that are to be met in order for each "context state" to change based on context triggers 224. As described in relation to FIG. 4, the conditions may be based on a variety of signals from various data sources, and the signal data can be compounded together through operations (e.g., NOT, AND, OR) and may be combined with parenthetical expressions to define the condition in which the context state 226 may change.

The context 120 may include a variety of context states 226, such as "always on", "always off", or a variety of alternative states as described in greater detail below. For example, an alternative context state may be created and an associated context trigger 224 may be associated with that state. Thus, the context state 226 may be activated when conditions defined in the context trigger 224 are met and deactivated when conditions defined in the context triggers 224 are not met. In another example, an alternative context state 226 may also be created and associated with a context trigger 224. In this example, the context state 226 is considered "compliant" when conditions defined in the context trigger 224 are met, and "non-compliant" when conditions defined in the context trigger 224 are not met.

The trusted service may also associate a variety of management objects 214 with the context 120. This can include management policies 218, management settings 216, or management resources 220, and so forth. This may also include association of management actions 222 to be taken in response to a context state 226, such as to lock the client device 102.

The scheduling system 408 is illustrated as providing context triggers 224 through interaction with a generic data source 406. As previously described, context triggers 224 may be configured in a variety of ways, such as intent information, signals produced by the system through data collection or sensors accessible to the device, and so forth.

For each context 120, when conditions meet or no longer meet the requirements for the context, the scheduling system 408 may inform the context manager core 404 that one or more context states 226 have changed. The context manager core 404 is representative of functionality to maintain a list of each of the contexts 120 and their respective context states 226. The context manager core 404 may then interact with other components including policy/settings engine 410, resource 412 management, or other system components 414 to inform them of a context state 226 change for each context 120 and for each component to take a corresponding action, if desired.

Thus, after the device management system 122 has been provisioned with the context 120, the trusted service is no longer involved in decisions made and actions taken by the device management system 122. This is unlike other conventional techniques that depend on connection to a service or service-based rule processing. Rather, the device management system 122 may process context triggers 224 locally on the client device 102 and take immediate actions to change management rules (policies/settings), management resources availability, and initiate management actions directly on the device. This may be utilized to support a variety of different usage scenarios, examples of which are described in the following.

In a first example of a usage scenario, a client device 102 may be configured as a device commonly referred to as being involved in the "Internet of Things," such as a light bulb, thermostat, kitchen appliance (e.g., refrigerator, toaster, mixer, oven), landscape system (e.g., watering, lighting), and so forth. Connection of the client device 102 to a wireless network at the user's home may result in formation of the authenticated connection 210 as described in relation to FIG. 2. A trusted service module 118 of a service provider 104, which may be associated with a manufacturer of the client device 102, may then provision the client device 102 using one or more contexts 120. Once provisioned, the client device 102 may determine a context state 226 based on context triggers 224 as processed using the management objects 214 that specify conditions for the context 120.

In another example usage scenario, the client device 102 may be configured as a key fob for a vehicle, such as a car, boat, and so forth. The client device 102 may be provisioned by the service provider 102 to include a context 120 that specifies that another device associated with a user (e.g., the user's phone) is to be present along with the key fob to permit access to the vehicle associated with the key fob, e.g., detected using NFC, RFID, and so forth. In this way, the context 120 may support another level of user authentication before being used to grant access to the vehicle. Thus, in each of the examples the client device 102 is provisioned and then may react offline to context triggers 224 to perform actions 392 based on a context state. Other examples, including usage scenarios, are also contemplated, further discussion of which may be found in relation to the following procedures.

In a further example, a context 120 may include context triggers 224 such that when the client device 102 is in range of a corporate owned Wi-Fi access point (as defined during the initial provisioning of contexts and triggers), a context trigger 224 for the Wi-Fi being nearby is fired to indicate that the client device 102 can access corporate resources. This context trigger 224 is used to apply policies forcing the screen to timeout after one minute and blocks the camera. Once the client device 102 is no longer in range of the corporate Wi-Fi, the client device 102 senses this through the one or more context triggers 224 and the more restrictive context is disabled for the time being.

Bounce detection and thresholds may also be employed. Continuing with the previous example, if the corporate Wi-Fi becomes unavailable and then available every three seconds, the client device 102 could bounce back and forth between contexts, which may be undesirable. Accordingly, bounce detection may be employed to wait for some defined period of time if context triggers were fired rapidly so as to wait until the client device 102 is in a steady state before applying. This may be performed using thresholds for individual context triggers (e.g., so each sensor may have a different threshold) and may also be performed as a whole, e.g., to wait a predefined period of time for the context triggers as a whole to stabilize before engaging in a change of state.

Example Procedures

The following discussion describes contextually aware device management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the figures described above.

Functionality, features, and concepts described in relation to the examples of FIGS. 1-3 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Figure 5:
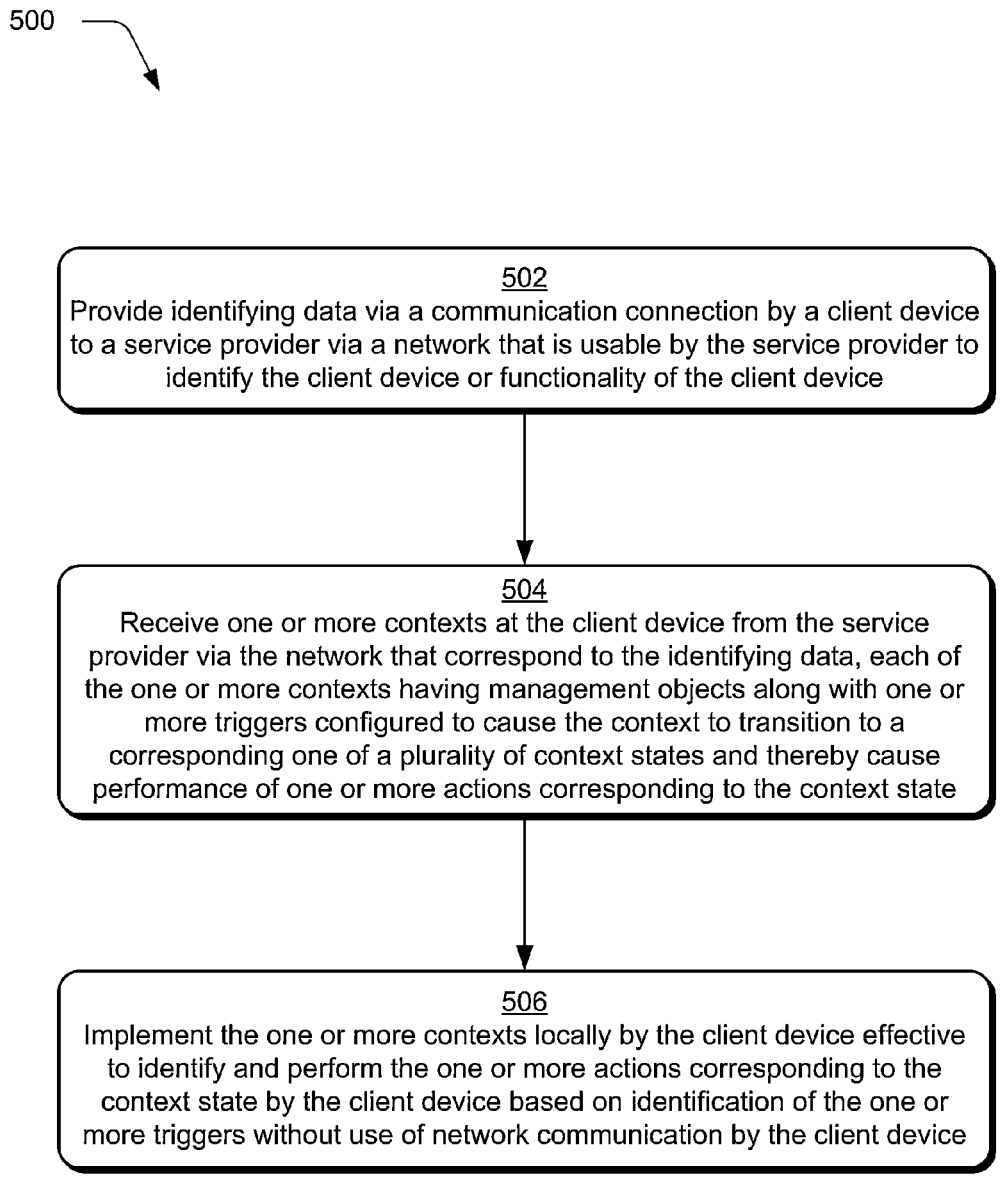
FIG. 5 is a flow diagram depicting a procedure in an example implementation in which a client device is provisioned with a context that is used to manage performance of actions locally at the client device.

FIG. 5 depicts a procedure 500 in an example implementation in which a client device is provisioned with a context that is used to manage performance of actions locally at the client device. Identifying data is provided via a communication connection by a client device to a service provider via a network that is usable by the service provider to identify the client device or functionality of the client device (block 502). The identifying data, for instance, may identify the device through serial number, model number and may also identify the device through association of the device with a user or business.

One or more contexts are received at the client device from the service provider via the network that correspond to the identifying data. Each of the one or more contexts includes management objects along with one or more triggers configured to cause the context to transition to a corresponding one of a plurality of context states and thereby cause performance of one or more actions corresponding to the context state (block 504). The triggers, for instance, may specify a set of conditions that, if met, cause a transition to a corresponding context state (e.g., on, off, or intermediate state) having corresponding actions that are caused to be performed based on the state.

The one or more contexts are implemented locally by the client device effective to identify and perform the one or more actions corresponding to the context state by the client device based on identification of the one or more triggers without use of network communication by the client device (block 506). As the context triggers may be configured in a variety of ways, so too may the actions performed that are associated with the context triggers, such as to unlock a car, turn out lights, permit access to a hotel room, and so forth.

Figure 6:
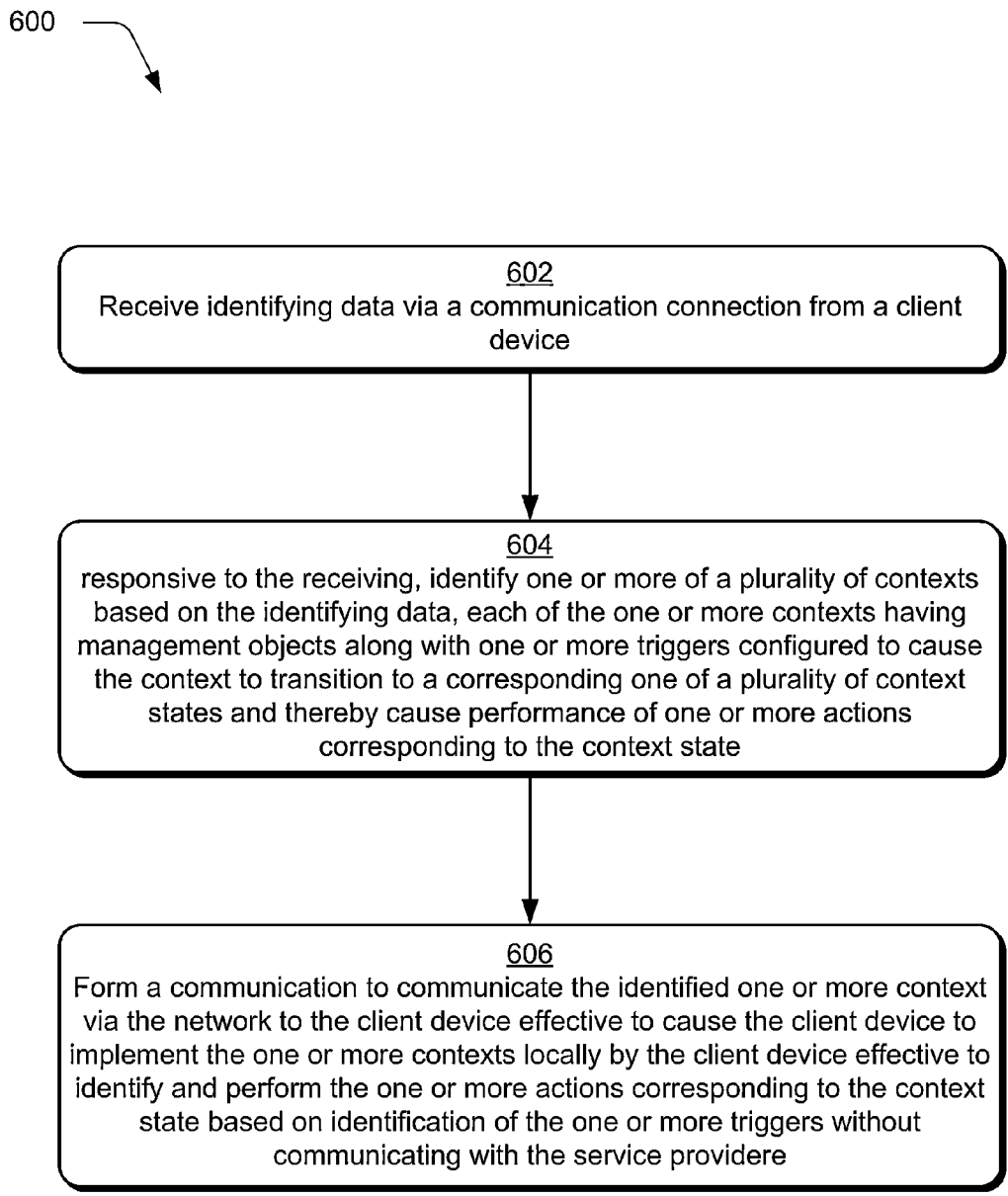
FIG. 6 is a flow diagram depicting a procedure in an example implementation in which a service provider provisions a client device using a context selected based on identifying information of the device.

FIG. 6 depicts a procedure 600 in an example implementation in which a service provider provisions a client device using a context selected based on identifying information of the device. Identifying data is received via a communication connection from a client device (block 602). As before, the identifying data may take a variety of forms to identify the client device and functionality of the client device 102, such as particular hardware or software resources available locally on the client device 102.

Responsive to this receipt, one or more of a plurality of contexts are identified based on the identifying data, each of the one or more contexts having management objects along with one or more triggers configured to cause the context to transition to a corresponding one of a plurality of context states and thereby cause performance of one or more actions corresponding to the context state (block 604). The service provider 104, and more particularly the trusted service module 118, may select one or more of a plurality of contexts that correspond to the client device 102, such as for a particular user, associated with a particular enterprise (e.g., business), and so forth.

A communication is formed to communicate the identified one or more context via the network to the client device effective to cause the client device to implement the one or more contexts locally by the client device effective to identify and perform the one or more actions corresponding to the context state based on identification of the one or more triggers without communicating with the service provider (block 606). Continuing with the previous example, once communication and provisioning of the context 120 is completed by the client device 102, the involvement of the trusted service module 118 with the client device 102 may cease, except to update the context 120 as desired. In this way, management and corresponding actions taken by the client device 102 may be performed offline without use of a network connection. A variety of other examples are also contemplated as previously described.

Example System and Device

Figure 7:
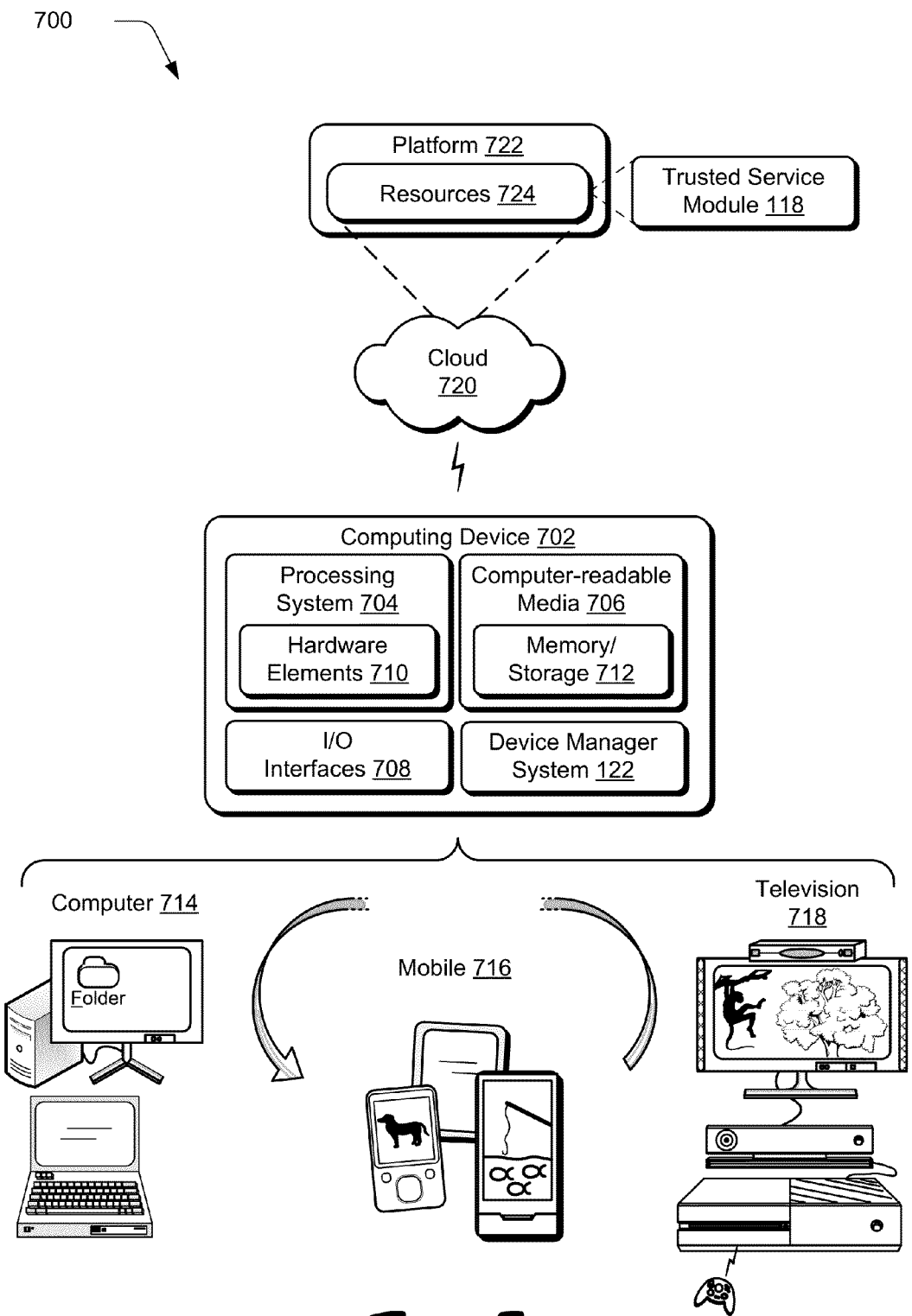

FIG. 7 illustrates an example system generally at 700 that includes an example computing device 702 that is representative of one or more computing systems and/or devices that may implement the various techniques described herein. This is illustrated through inclusion of the device manager system 122 and trusted service module 118. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:
1. A method comprising:
providing identifying data, by a client device, to a service provider via a network, the identifying data being usable by the service provider to identify the client device or functionality associated with the client device, or both;
receiving one or more contexts at the client device from the service provider via the network, the one or more con- texts corresponding to the identifying data, and each of the one or more contexts having management objects and one or more triggers configured to cause the one or more contexts to transition to a corresponding one of a plurality of context states, the transition to the corresponding one of the plurality of context states causing performance of one or more actions associated with the corresponding one of the plurality of context states; and implementing the one or more contexts locally by the client device effective to identify and perform the one or more actions by the client device based on identification of the one or more triggers without use of network communication by the client device.

2. The method as described in claim 1, wherein the one or more management objects specify management settings, management policies, or management resources.

3. The method as described in claim 1, wherein the identifying data is configured to cause the service provider to select the one or more contexts from a plurality of contexts and to communicate the selected one or more contexts to the client device via the network automatically and without user intervention.

4. The method as described in claim 1, wherein the implementing is performed without communication with the service provider.

5. The method as described in claim 1, wherein the one or more contexts are formed to support tiered applicability and through specified dependencies of at least one of the one or more contexts with another of the one or more contexts.

6. The method as described in claim 1, wherein the one or more contexts have a specified lifespan after which the one or more contexts are deactivated.

7. The method as described in claim 6, wherein the lifespan is specified using one or more non-temporal conditions.

8. The method as described in claim 1, wherein the one or more triggers include active queries of signal data.

9. The method as described in claim 1, wherein the one or more triggers include:
  location data; and
  at least one of API calls, sensor data, inferences form user actions, NFC data, systems states, or network connections.

10. A service provider comprising:
  one or more modules implemented at least partially in hardware, the one or more modules configured to perform operations comprising:
    receiving identifying data from a client device via a network;
    responsive to the receiving, identifying one or more of a plurality of contexts based on the identifying data, each of the one or more contexts having management objects and one or more triggers configured to cause the one or more contexts to transition to a corresponding one of a plurality of context states, the transition to the corresponding one of the plurality of context states causing performance of one or more actions associated with the corresponding one of the plurality of context states; and
    communicating the identified one or more contexts to the client device via the network effective to cause the client device to implement the one or more contexts locally and to identify and perform the one or more actions associated with the corresponding one of the plurality of context states based on identification of the one or more triggers without communicating with the service provider.

11. The service provider as described in claim 10, wherein the one or more management objects specify management settings, management policies, and management resources.

12. The service provider as described in claim 10, wherein the one or more contexts have a specified lifespan after which the one or more contexts are deactivated.

13. The service provider as described in claim 10, wherein the one or more triggers include active queries of signal data.

14. The service provider as described in claim 10, wherein the one or more triggers do not include location data.

15. A client device comprising:
  a processing system; and
  memory maintaining instructions that are executable by the processing system to implement an operating system configured to cause operations to be performed comprising:
    providing identifying data, to a service provider via a network, the identifying data being usable by the service provider to identify the client device or functionality associated with the client device, or both;
    receiving one or more contexts from the service provider via the network, the one or more contexts corresponding to the identifying data, and each of the one or more contexts having management objects and one or more triggers configured to cause the one or more contexts to transition to a corresponding one of a plurality of context states, the transition to the corresponding one of the plurality of context states causing performance of one or more actions associated with the corresponding one of the plurality of context states; and
    implementing the one or more contexts locally effective to identify and perform the one or more actions by the client device based on identification of the one or more triggers without use of network communication by the client device.

16. The client device as described in claim 15, wherein the triggers include API calls or system states.

17. The client device as described in claim 15, wherein the triggers include sensor data and location information.

18. The client device as described in claim 15, wherein the triggers include inferences from user actions.

19. The client device as described in claim 15, wherein the one or more management objects specify management settings, management policies, and management resources.

20. The client device as described in claim 15, wherein the one or more contexts have a specified lifespan after which the one or more contexts are deactivated.

* * * * *